United States Patent
Ugajin

(10) Patent No.: US 11,916,589 B2
(45) Date of Patent: Feb. 27, 2024

(54) SUBMARINE DEVICE, SUBMARINE DEVICE MONITORING METHOD, AND OPTICAL COMMUNICATION SYSTEM

(71) Applicant: NEC Corporation, Tokyo (JP)

(72) Inventor: Kazusa Ugajin, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/641,556

(22) PCT Filed: Jul. 20, 2020

(86) PCT No.: PCT/JP2020/028121
§ 371 (c)(1),
(2) Date: Mar. 9, 2022

(87) PCT Pub. No.: WO2021/059703
PCT Pub. Date: Apr. 1, 2021

(65) Prior Publication Data
US 2022/0303002 A1  Sep. 22, 2022

(30) Foreign Application Priority Data
Sep. 24, 2019 (JP) .................. 2019-172751

(51) Int. Cl.
H04B 10/077 (2013.01)
H04B 13/02 (2006.01)
(52) U.S. Cl.
CPC ........... H04B 10/077 (2013.01); H04B 13/02 (2013.01)
(58) Field of Classification Search
CPC ............... H04B 10/077; H04B 13/02
(Continued)

(56) References Cited

U.S. PATENT DOCUMENTS 9,166,726 B2  10/2015  Aida
2017/0047990 A1*  2/2017  Kawaguchi ........ H04B 10/0775
2019/0190603 A1  6/2019  Asada

FOREIGN PATENT DOCUMENTS

CN  106664151 A  5/2017
CN  107735963 A  2/2018
(Continued)

OTHER PUBLICATIONS

International Search Report for PCT Application No. PCT/JP2020/028121, dated Oct. 13, 2020.
(Continued)

*Primary Examiner* — Mohammad R Sedighian

(57) ABSTRACT

Provided are a submarine device, a submarine device monitoring method, and an optical communication system with which, even if a failure occurs, the failure occurrence location can be identified, and information necessary for recovery can be collected. This submarine device is provided with: a processing means for processing an input optical signal and outputting the processed optical signal; a first branching means for causing the optical signal input into the processing means to branch, and for outputting first branched light; a second branching means for causing the optical signal output from the processing means to branch, and for outputting second branched light; a selecting means for selecting and outputting the first branched light and the second branched light; and a monitoring means for monitoring the branched light output from the selecting means.

9 Claims, 11 Drawing Sheets

(58) Field of Classification Search
USPC .......................................................... 398/16
See application file for complete search history.

(56) References Cited

FOREIGN PATENT DOCUMENTS

| | | | |
|---|---|---|---|
| CN | 109417425 | A | 3/2019 |
| EP | 2701316 | A1 | 2/2014 |
| JP | H09-289494 | A | 11/1997 |
| JP | 2001-186095 | A | 7/2001 |
| JP | 2017-038328 | A | 2/2017 |
| WO | 2012/144585 | A1 | 10/2012 |
| WO | 2018/003912 | A1 | 1/2018 |
| WO | 2019/065383 | A1 | 4/2019 |

OTHER PUBLICATIONS

English translation of Written opinion for PCT Application No. PCT/JP2020/028121, dated Oct. 13, 2020.
Extended European Search Report for EP Application No. EP20869774.8 dated Nov. 2, 2022.
CN Office Action for CN Application No. 202080057729.6, dated Sep. 15, 2023 with English Translation.

* cited by examiner

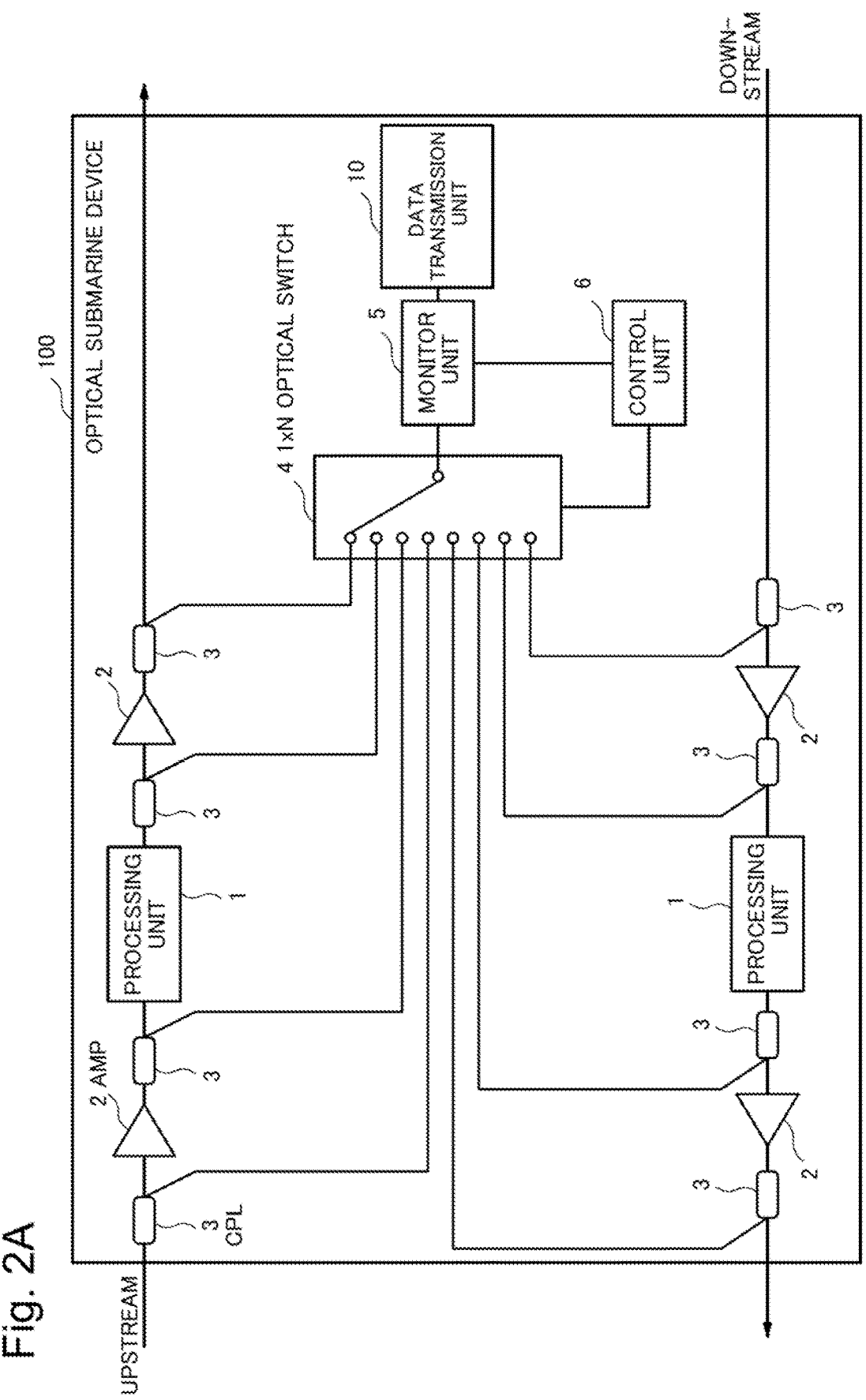

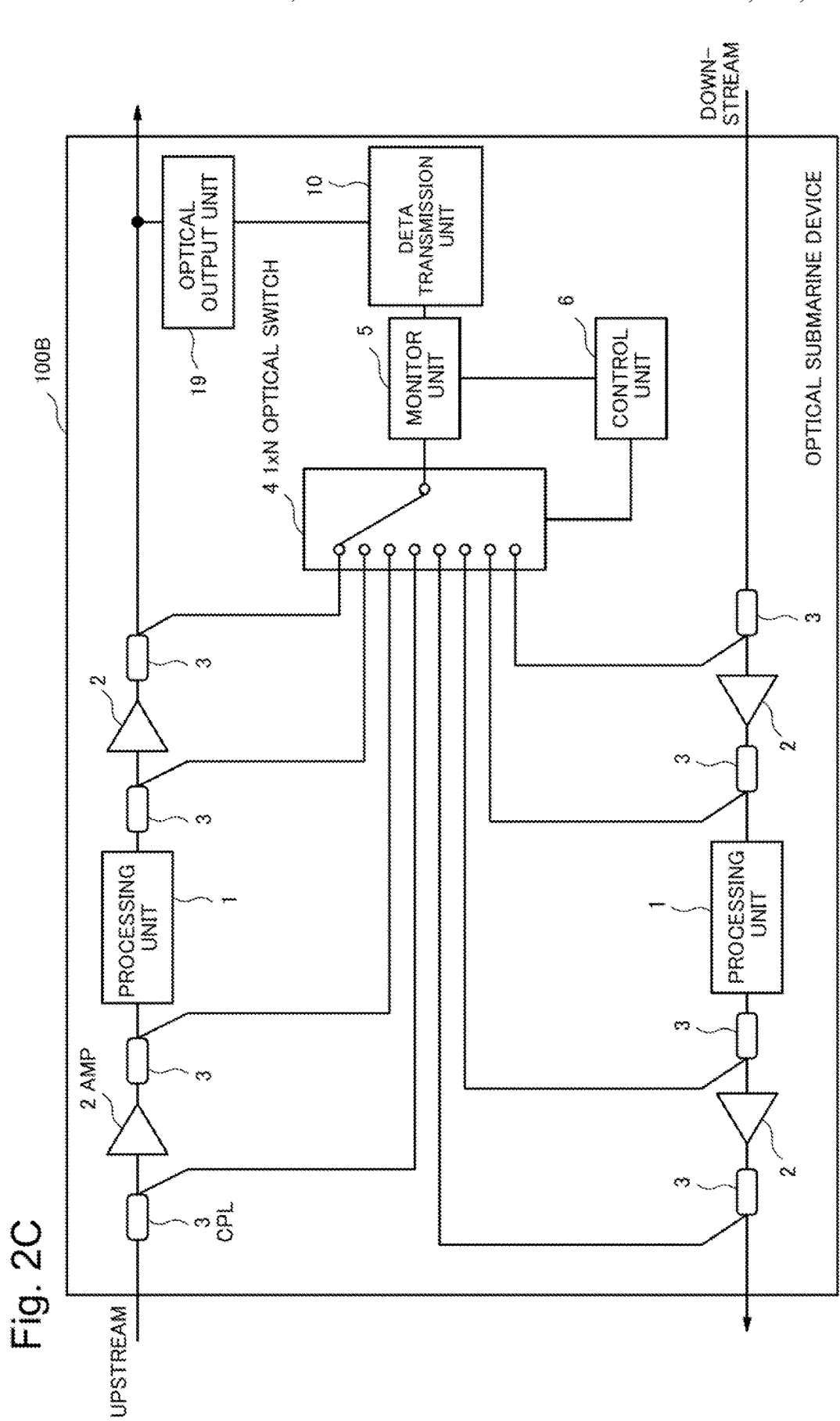

SUBMARINE DEVICE, SUBMARINE DEVICE MONITORING METHOD, AND OPTICAL COMMUNICATION SYSTEM

This application is a National Stage Entry of PCT/JP2020/028121 filed on Jul. 20, 2020, which claims priority from Japanese Patent Application 2019-172751 filed on Sep. 24, 2019, the contents of all of which are incorporated herein by reference, in their entirety.

TECHNICAL FIELD

The present invention relates to a submarine device, a submarine device monitoring method, and an optical communication system, and more particularly, to an optical submarine device monitoring method.

BACKGROUND ART

In a submarine cable system, an optical submarine device such as a submarine repeater, a submarine gain equalizer, and a submarine branching device is arranged in the middle of an optical transmission line such as an optical cable connecting a plurality of terminal stations on land. The optical submarine device is operated by receiving current supply from a terminal device on land via a power supply line.

FIG. 9 is a block diagram for explaining the optical submarine device of the background art. An optical submarine device 1000 in FIG. 9 is, for example, a processing unit inserted into two optical transmission lines in an upstream direction and a downstream direction, and includes a processing unit 1001U inserted into the upstream direction optical transmission line and a processing unit 1001D inserted into the downstream direction optical transmission line. The optical submarine device 1000 in FIG. 9 further includes a plurality of AMPs 1002 (optical amplifiers 1002) that are inserted into transmission lines in the upstream direction and the downstream direction and amplify optical signals. Further, in the optical submarine device 1000 in FIG. 9, a large number of monitor points are set in each of the optical transmission lines, and a CPL 1003 (coupler 1003) is inserted in each of the monitor points in the optical transmission line. The CPL 1003 branches monitor light from the optical transmission line. The monitor light branched by the CPL 1003 is monitored by each monitor unit 1004, and a monitoring result is sent to a data transmission unit 1005. The data transmission unit 1005 transmits the monitoring result to a terminal station device on land via the optical transmission line.

An optical signal transmitted from the terminal station on land via the optical transmission line is input to the optical submarine device 1000, and then amplified by the AMP 1002 in such a way as to have light intensity suitable for the processing units 1001U and 1001D. The amplified optical signal is input to the processing units 1001U and 1001D, and various processes are performed by the processing units 1001U and 1001D. The processed optical signal is amplified by the AMP 1002 in order to compensate for attenuation caused by the processing units 1001U and 1001D.

In the configuration as illustrated in FIG. 9, for example, it is necessary to monitor intensity of an optical signal to be input to the optical submarine device 1000, an optical signal to be input to the processing units 1001U and 1001D, an optical signal to be output from the processing units 1001U and 1001D, and an optical signal to be output from the optical submarine device 1000. Therefore, the CPL 1003 branches an optical signal into signal light and monitor light at each of the monitor points, and monitoring is performed by inputting the monitor light to the monitor unit 1004. Monitor data collected by each monitor unit 1004 are transmitted to each terminal station via the data transmission unit 1005. As a result, monitoring of the optical submarine device 1000 from the terminal station on land is achieved.

In the optical submarine device 1000 in FIG. 9, monitor light is branched from the CPL 1003 at a set monitor point, and the monitor unit 1004 monitors the monitor light, whereby an operating state of the optical submarine device 1000 can be monitored. Even when a failure occurs in the optical submarine device 1000, it is possible to identify a location where the failure occurs or collect information necessary for recovery.

Patent Literature 1 (PTL1) relates to a monitoring device for a submarine cable network line in which a plurality of relay stations are inserted in a relay line between a transmitting-side terminal station and a receiving-side terminal station, and proposes providing a line monitoring device in the transmitting-side terminal station. In PTL1, it is proposed that an optical signal and a line monitoring signal being output from an optical transmitter in a transmitting-side terminal station are amplified by a relay station and reach a receiving-side terminal station via an optical submarine branching device, and a part thereof is returned by a return line in the relay station and fed back to the transmitting-side terminal station, and then whether the feedback signal is normal or abnormal is determined. In PTL1, when determining whether a feedback signal is normal or abnormal, it is possible to estimate or identify a relay station in which a defect or a failure occurs among the plurality of relay stations inserted in the relay line, by detecting from which relay station a feedback signal with low power is coming.

CITATION LIST

Patent Literature

[PTL1] Japanese Laid-Open Patent Application No. Hei09-289494

SUMMARY OF INVENTION

Technical Problem

However, the above-described optical submarine device of the background art has the following problems.

In the optical submarine device 1000, a large number of monitor points are set in order to maintain performance of the optical submarine device 1000. For example, when a variation or the like of an amplification characteristic occurs in the AMP 1002 inserted into the optical transmission line, the variation or the like is detected and thereby the amplification characteristic is corrected in such a way that the variation is canceled. In order to identify a location where a characteristic variation occurs, or in some cases, a location where a failure occurs, as the number of units or components to be inserted into the optical transmission line increases, the number of monitor points to be set also increases.

In the optical submarine device 1000 in FIG. 9, the monitor unit 1004 is required for each point where light intensity is to be measured, and therefore the number of components increases and amounting area increases. Further, since complexity of the optical submarine device has increased in recent years, the number of monitor points that a user needs to monitor has been increasing. Meanwhile, when the number of the monitor points is insufficient, it is not possible to acquire a location where a failure occurs or information necessary for recovery. In order to avoid these problems, it is necessary to add a large number of the monitor units 1004, which causes a problem that the device becomes lager and more expensive.

In addition, when a large number of the monitor units 1004 are mounted in the device, wiring of optical fibers becomes complicated and connectivity becomes poor. For this reason, it is considered that the number of manufacturing steps and the number of connection errors may increase. Further, as the number of components increases, reliability of the device decreases. This is fatal for an optical submarine device for which long-term operation is required. In order to suppress deterioration of the reliability, it is necessary to adopt a redundant configuration, but when the redundant configuration is adopted, the number of components doubles and a size and a price of the device further increase.

PTL1 relates to monitoring of a submarine cable network line in which a plurality of relay stations are inserted in a relay line between a transmitting-side terminal station and a receiving-side terminal station, but is not capable of specifying a location where a failure occurs in one relay station or one optical submarine branching device.

An object of the present invention is to provide a submarine device, a submarine device monitoring method, and an optical communication system that are capable of achieving monitoring of a desired number of monitor points while reducing the number of components, and are capable of identifying a location where a failure occurs and collecting information necessary for recovery, even when a failure occurs.

Solution to Problem

In order to achieve the above-described object, a submarine device according to the present invention includes:
a processing means for processing and outputting an input optical signal;
a first branching means for branching an optical signal to be input to the processing means and outputting first branched light;
a second branching means for branching an optical signal being output from the processing means and outputting second branched light;
a selecting means for selecting and outputting the first branched light and the second branched light; and
a monitoring means for monitoring branched light being output from the selecting means.

An optical communication system according to the present invention includes:
an optical transmission line between a plurality of terminal stations; and
the submarine device being inserted into the optical transmission line.

A submarine device monitoring method according to the present invention is a method of monitoring a submarine device including: a processing means for processing and outputting an input optical signal; a first branching means for branching an optical signal to be input to the processing means and outputting first branched light; a second branching means for branching an optical signal being output from the processing means and outputting second branched light; a selecting means for selecting and outputting the first branched light and the second branched light; and a monitoring means for monitoring branched light being output from the selecting means, the method including:
causing the selecting means to select one of the first branched light and the second branched light; and
causing the monitoring means to monitor branched light selected by the selecting means.

Advantageous Effects of Invention

According to the present invention, it is possible to provide a submarine device, a submarine device monitoring method, and an optical communication system that are capable of achieving monitoring of a desired number of monitor points while reducing the number of components, and are capable of identifying a location where a failure occurs and collecting information necessary for recovery, even when a failure occurs.

BRIEF DESCRIPTION OF DRAWINGS

FIG. 2A is a block diagram for explaining an optical submarine device according to a first example embodiment.

FIG. 2C is a block diagram for explaining a specific example of the optical submarine device according to the first example embodiment.

EXAMPLE EMBODIMENT

A desirable example embodiment of the present invention will be described in detail with reference to the drawings. Before description of a specific example embodiment, an optical submarine device and an optical submarine device monitoring method according to an example embodiment of a superordinate concept of the present invention will be described.

Figure 1A:
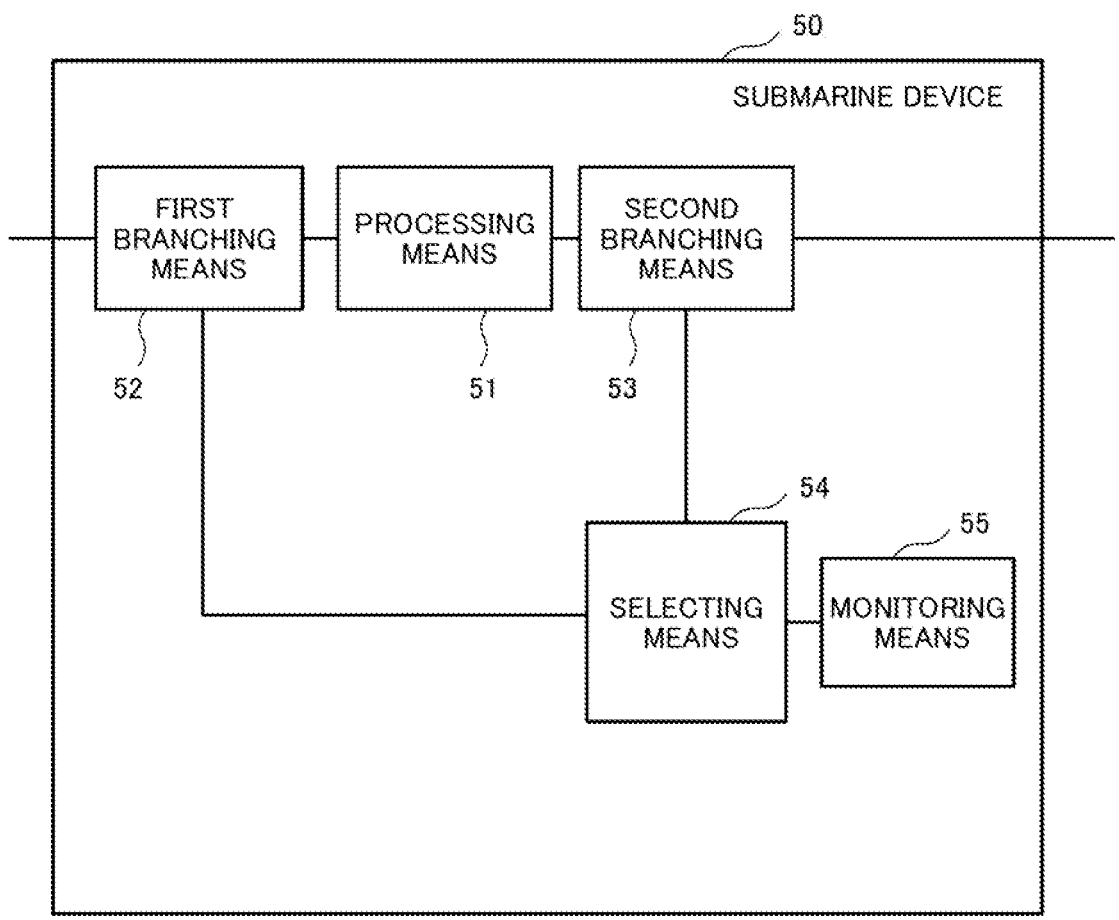
FIG. 1A is a block diagram for explaining an optical submarine device according to an example embodiment of a superordinate concept of the present invention.
Figure 1B:
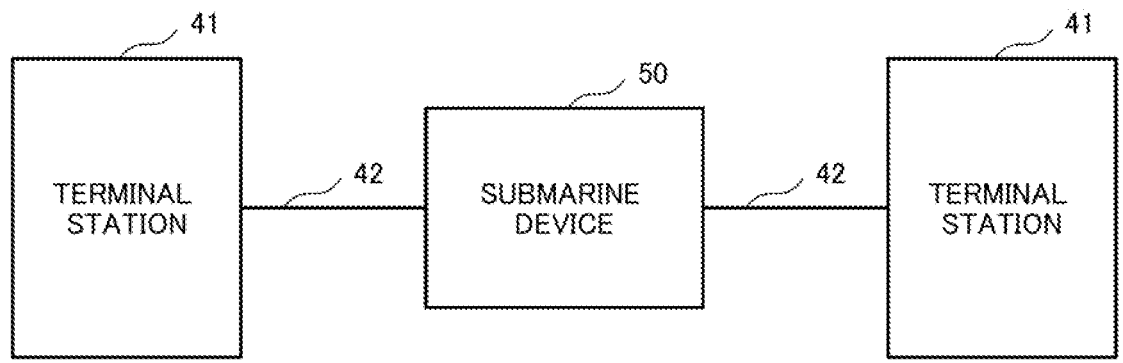
FIG. 1B is a conceptual diagram of an optical communication system in which an optical submarine device according to an example embodiment of the present invention is disposed.

FIG. 1A is a block diagram for explaining an optical submarine device according to the example embodiment of the superordinate concept of the present invention. FIG. 1B is a conceptual diagram of an optical communication system in which an optical submarine device according to an example embodiment of the present invention is disposed.

The optical submarine device according to the example embodiment of the present invention is inserted, in a similar way as a submarine device 50 in FIG. 1B, into an optical transmission line represented by an optical fiber between a plurality of terminal stations 41.

The submarine device 50 in FIG. 1A includes a processing means 51 for processing and outputting an input optical signal, a first branching means 52 for branching an optical signal to be input to the processing means 51 and outputting first branched light, and a second branching means 53 for branching an optical signal being output from the processing means 51 and outputting second branched light. The submarine device 50 in FIG. 1A further includes a selecting means 54 for selecting and outputting the first branched light and the second branched light, and a monitoring means 55 for monitoring the branched light being output from the selecting means.

The first branching means 52 is, for example, an optical coupler. The first branching means 52 branches an optical signal being input from a transmitting-side terminal station and outputs the branched optical signal to the processing means 51 and the selecting means 54. The processing means 51 is, for example, any one of an optical amplifier, a gain equalizer, and a branching device. Alternatively, the processing means 51 may be a combination of an optical amplifier, a gain equalizer, and a branching device. The second branching means 53 is, for example, an optical coupler. The second branching means 53 branches the optical signal processed by the processing means 51, and outputs the branched optical signal to the selecting means 54 and a receiving-side terminal station. The selecting means 54 selects and outputs the first branched light and the second branched light, and may be configured by, for example, an optical switch or a plurality of VOAs and a multiplexer. The monitoring means 55 is, for example, a photoreceptor. The monitoring means 55 monitors intensity of the first branched light and the second branched light.

In the submarine device 50 in FIG. 1A, an optical submarine device and an optical submarine device monitoring method that are capable of identifying a location where a failure occurs and collecting information necessary for recovery by the monitoring means 55 are able to be provided. In addition, by adopting a configuration in which the selecting means 54 selects the first branched light branched by the first branching means 52 and the second branched light branched by the second branching means 53 and provides the selected branched light for the monitoring means 55, it is possible to monitor the optical submarine device while suppressing enlargement of the device, even when the number of monitoring points increases. Hereinafter, a more specific example embodiment will be described.

First Example Embodiment

Figure 3:
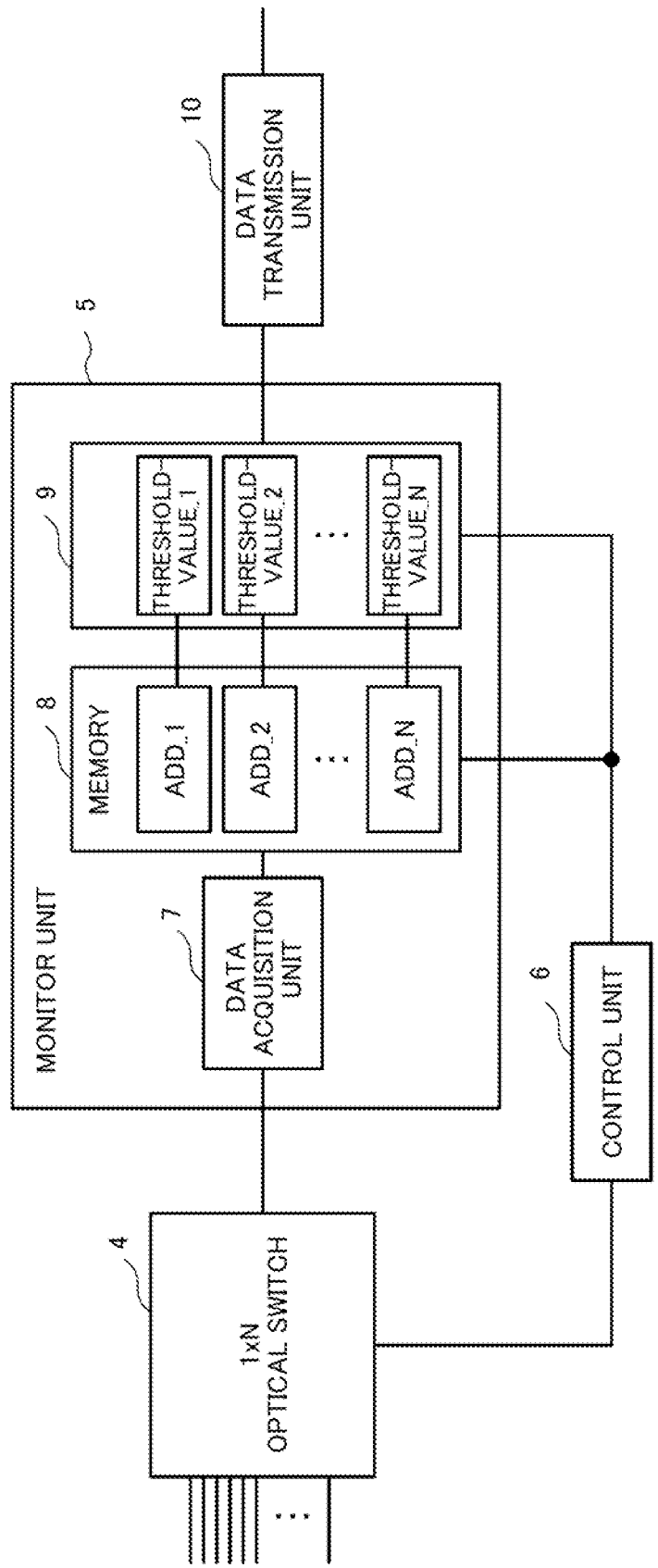
FIG. 3 is a block diagram for explaining details of a partial configuration of the optical submarine device in FIG. 2A.
Figure 4:
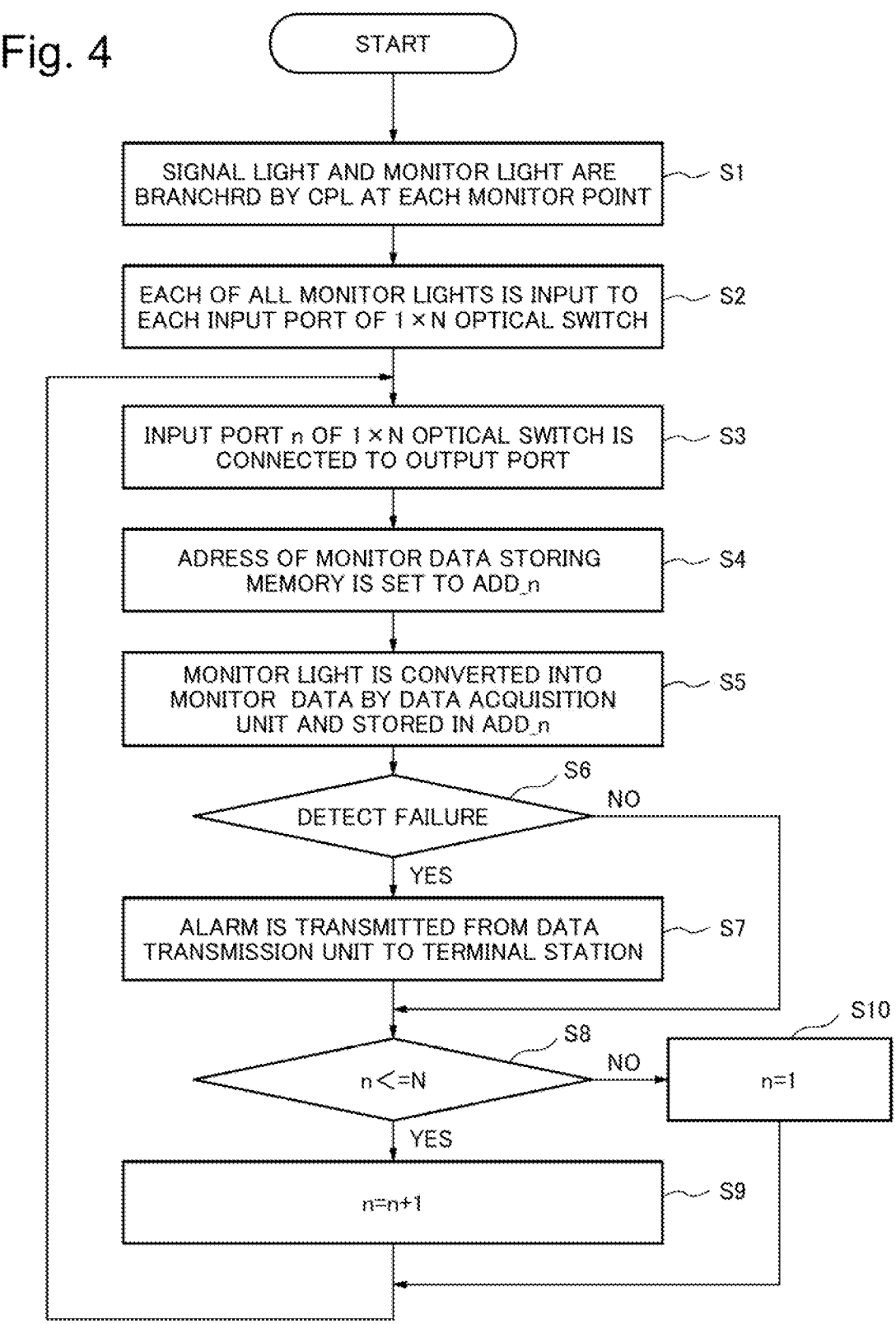
FIG. 4 is a flowchart for explaining a monitoring operation of the optical submarine device according to the first example embodiment.

Next, an optical submarine device and an optical submarine device monitoring method according to a first example embodiment of the present invention will be described. FIG. 2A is a block diagram for explaining the optical submarine device according to the first example embodiment. FIG. 3 is a block diagram for explaining details of a partial configuration of the optical submarine device in FIG. 2A. FIG. 4 is a flowchart for explaining a monitoring operation of the optical submarine device according to the first example embodiment.
(Configuration of Example Embodiment)

An optical submarine device 100 in FIG. 2A is a submarine device to be inserted into an optical transmission line 42 such as an optical fiber connecting terminal stations 41, illustrated in an optical communication system in FIG. 1B, and is exemplified by a submarine repeater, a submarine gain equalizer, a submarine branching device, and the like. The optical submarine device 100 in FIG. 2A illustrates a case in which the optical submarine device 100 is inserted into an optical transmission line in an upstream direction and an optical transmission line in a downstream direction. The optical submarine device 100 in FIG. 2A includes a processing unit 1 inserted into an optical transmission line such as the optical transmission line 42 between the plurality of terminal stations 41 in the optical communication system illustrated in FIG. 1B, and a N×1 optical switch 4 as an example of a selecting means to which monitor lights each branched at each of a plurality of monitor points being set in the optical transmission line are input, and by which one of the branched monitor lights is selected. The optical submarine device 100 in FIG. 2A further includes a monitor unit 5 as an example of a monitoring means for monitoring light intensity of the monitor light selected by the N×1 optical switch 4, and a control unit 6 that controls the N×1 optical switch 4 and the monitor unit 5. The optical submarine device 100 in FIG. 2A further includes a data transmission unit 10 as an example of a data transmission means for transmitting a monitoring result of the monitor unit 5 to a terminal station. A coupler 3 (CPL 3) as an example of a monitor light branching means is disposed at each of the plurality of monitor points being set in the optical transmission line in the optical submarine device 100 in FIG. 2A, and branches signal light and monitor light from an optical signal on the optical transmission line.

The N×1 optical switch 4 is an optical switch having N inputs and one output. The monitor lights branched by the CPL 3 are input to the N×1 optical switch 4, and the N×1 optical switch 4 selects one monitor light under control of the control unit 6, and provide the selected monitor light to the monitor unit 5. The monitor unit 5 compares a preset reference value of monitor light with light intensity of the monitor light provided from the N×1 optical switch 4, thereby collecting information on presence or absence of a failure occurrence, and necessary information. In the optical submarine device 100 in FIG. 2A, as an example, the CPL 3 is arranged in each of the upstream optical transmission line and the downstream optical transmission line, on an assumption that intensity of an optical signal to be input to the optical submarine device 100, an optical signal to be input to the processing unit 1, an optical signal to be output from the processing unit 1, and an optical signal to be output from the optical submarine device 100 is to be monitored.

In the optical submarine device 100 in FIG. 2A, it is possible, by the monitor unit 5, to identify a location where a failure occurs or collect information necessary for recovery. Further, by the configuration in which the N×1 optical switch 4 selects one of the monitor lights branched at a plurality of monitor points and provides the selected monitor light for the monitor unit 5, it is possible to achieve monitoring of the optical submarine device while suppressing enlargement of the device, even when the number of the monitor points increases.

In the optical submarine device according to the present example embodiment, a signal at the monitor point is branched by the CPL 3. One of branched signals is input, as monitor light, to an input side of the N×1 optical switch 4. In the optical submarine device in FIG. 2A, as an example, the CPL 3 is disposed on each of the optical transmission line in the upstream direction and the optical transmission line in the downstream direction, assuming that intensity of the optical signal to be input to the optical submarine device 100, the optical signal to be input to the processing unit 1, the optical signal to be output from the processing unit 1, and the optical signal to be output from the optical submarine device 100 is to be monitored.

In the optical submarine device 100 in FIG. 2A, monitor light from the CPL 3 disposed in the optical transmission line in the upstream direction and monitor light from the CPL 3 disposed in the optical transmission line in the downstream direction are both provided to the input port of one N×1 optical switch 4. In this way, in the optical submarine device 100 in FIG. 2A, all monitor lights are input to the input side of the N×1 optical switch 4 by performing a similar treatment at all points to be monitored. Next, an output from the N×1 optical switch 4 is input to the monitor unit 5. The monitor unit 5 converts the monitor light into data, stores the data in a memory 8, and detects a failure in the monitor point. The monitor data acquired by the monitor unit 5 and detected presence or absence of a failure are transmitted from the data transmission unit 10 to each terminal station. The monitor point is changed by controlling connection between the input port and the output port of the N×1 optical switch 4 by the control unit 6.

By the above-described means, it is possible to achieve monitoring of a desired number of monitor points while reducing the number of components, in the optical submarine device.

As illustrated in FIG. 3, the monitor unit 5 includes a data acquisition unit 7, the memory 8 for storing data, and a threshold value storing unit 9 for storing a preset threshold value for alarm detection. The memory 8 includes N memory areas ADD_1 to ADD_N in accordance with the N×1 optical switch 4 having N input ports. The threshold value storing unit 9 includes N threshold value storing areas in accordance with the N memory areas of the memory 8. The data acquisition unit 7 converts the monitor light into data, and stores the data in the memory 8 related to the monitor point. The data stored in the memory 8 is compared with a threshold value, which is stored in the threshold value storing unit 9 and is related to the monitor point, and thereby a failure is detected. The monitor data and presence or absence of a failure are transmitted from the data transmission unit 10 to each terminal station.

The control unit 6 controls a line connecting the input side and the output side of the N×1 optical switch 4, thereby changing the monitor light to be input to the monitor unit 5. Similarly, by changing an address of the memory 8 in which the data is to be stored and changing the threshold value to be compared being stored in the threshold value storing unit 9, it is possible to monitor a plurality of monitor points with one monitor unit 5.

(Operation of Example Embodiment)

Next, a monitoring operation of the optical submarine device 100 in FIG. 2A will be described with reference to the flowchart in FIG. 4. First, signal light and monitor light are branched by the CPL 3 disposed for each monitor point in the optical transmission line (Step S1). All branched monitor lights are each input to each of the input ports of the N×1 optical switch 4 (step S2). An input port n is connected to an output port of the N×1 optical switch 4 (step S3). An address of the memory 8 of the monitor unit 5 in which monitor data are to be stored is set to ADD_n (step 4). Next, the data acquisition unit 7 of the monitor unit 5 converts the monitor light into the monitor data, and stores the converted monitor data in a memory area of the address ADD_n of the memory 8 of the monitor unit 5 (step S5). The monitor data are compared with a threshold value n, and thereby failure detection is performed (step S6). When a failure is detected (Yes in step S6), the comparison result is transmitted from the data transmission unit 10 to a terminal station. In other words, when a failure is detected (Yes in step S6), an alarm is transmitted from the data transmission unit 10 to the terminal station (step S7). The monitor data stored in the memory area of the address ADD_n of the memory 8 is also transmitted to the terminal station. By comparing each piece of the transmitted monitor data with an expected value, the terminal station can acquire a location where the failure occurs. Next, the control unit 6 compares n with N (step S8), and when n is equal to or less than N, increments (n=n+1) the input port of the N×1 optical switch 4 and the address of the memory 8 of the monitor unit 5 (step S9). When n exceeds N in step S8, the control unit 6 resets the input port of the N×1 optical switch 4 and the address of the memory 8 of the monitor unit 5 to n=1 (step S10). Thereafter, steps S3 to S6 are repeated, the monitor lights from all the CPLs 3 are stored in the memory 8 and are compared with a preset threshold value for alarm detection, and thereby presence or absence of a failure is identified.

(Advantageous Effects of Example Embodiment)

In the optical submarine device 100 according to the present example embodiment, it is possible to provide an optical submarine device and an optical submarine device monitoring method that are capable of identifying a location where a failure occurs and collecting information necessary for recovery, by the monitor unit 5.

Further, by switching the monitor light by the N×1 optical switch 4, it is possible to monitor a plurality of monitor lights by one monitor unit 5. In other words, it is possible to monitor a desired monitor point while achieving reduction in the number of components, miniaturization of the device, and cost reduction. In addition, since optical fibers of a plurality of monitor points can be bundled by the N×1 optical switch 4, complexity of wiring of the optical fibers can also be eliminated. As a result, it is also possible to shorten the manufacturing process and reduce connection errors.

(Transmission Method of Data Transmission Unit)

A transmission method of the data transmission unit 10 of the optical submarine device in FIG. 2A will be described in more detail with reference to the drawings.

Figure 2B:
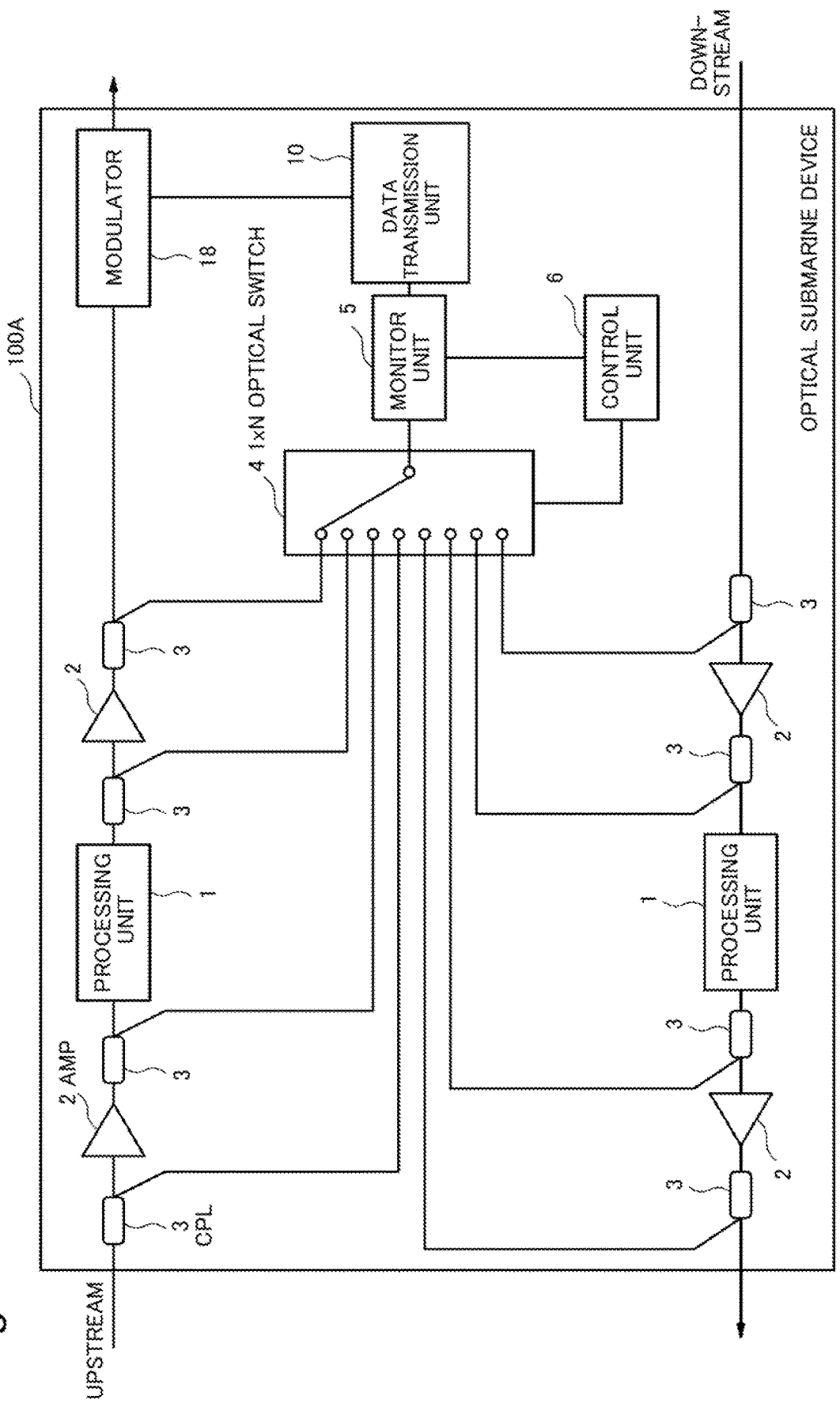
FIG. 2B is a block diagram for explaining a specific example of the optical submarine device according to the first example embodiment.

FIG. 2B is a block diagram for explaining a specific example of the optical submarine device according to the first example embodiment, and illustrates a configuration in a case of superimposing on all wavelengths. An optical submarine device 100A in FIG. 2B further includes a modulator 18 at an output stage of the optical transmission line. The data transmission unit 10 in FIG. 2B instructs the modulator 18 to modulate intensity of the optical signal, based on the comparison result (and the monitor data). As a result, the optical signal on which the comparison result (and the monitor data) is superimposed is output from the modulator 18 to the receiving-side terminal station. The modulator 18 is constituted of, for example, a variable optical attenuator (VOA) or an optical amplifier.

FIG. 2C is a block diagram for explaining another specific example of the optical submarine device according to the first example embodiment, and illustrates a configuration in a case of superimposing on a specific wavelength. An optical submarine device 100B in FIG. 2C further includes an optical output unit 19 in between the optical transmission line and the data transmission unit 10. The data transmission unit 10 in FIG. 2C instructs the optical output unit 19 in such a way that an optical signal having a specific wavelength modulated on the basis of the comparison result (and monitor data) is output. The optical signal being output from the optical output unit 19 is multiplexed with an optical signal from a processing unit 1 side, and transmitted to the receiving-side terminal station.

Second Example Embodiment

Figure 5:
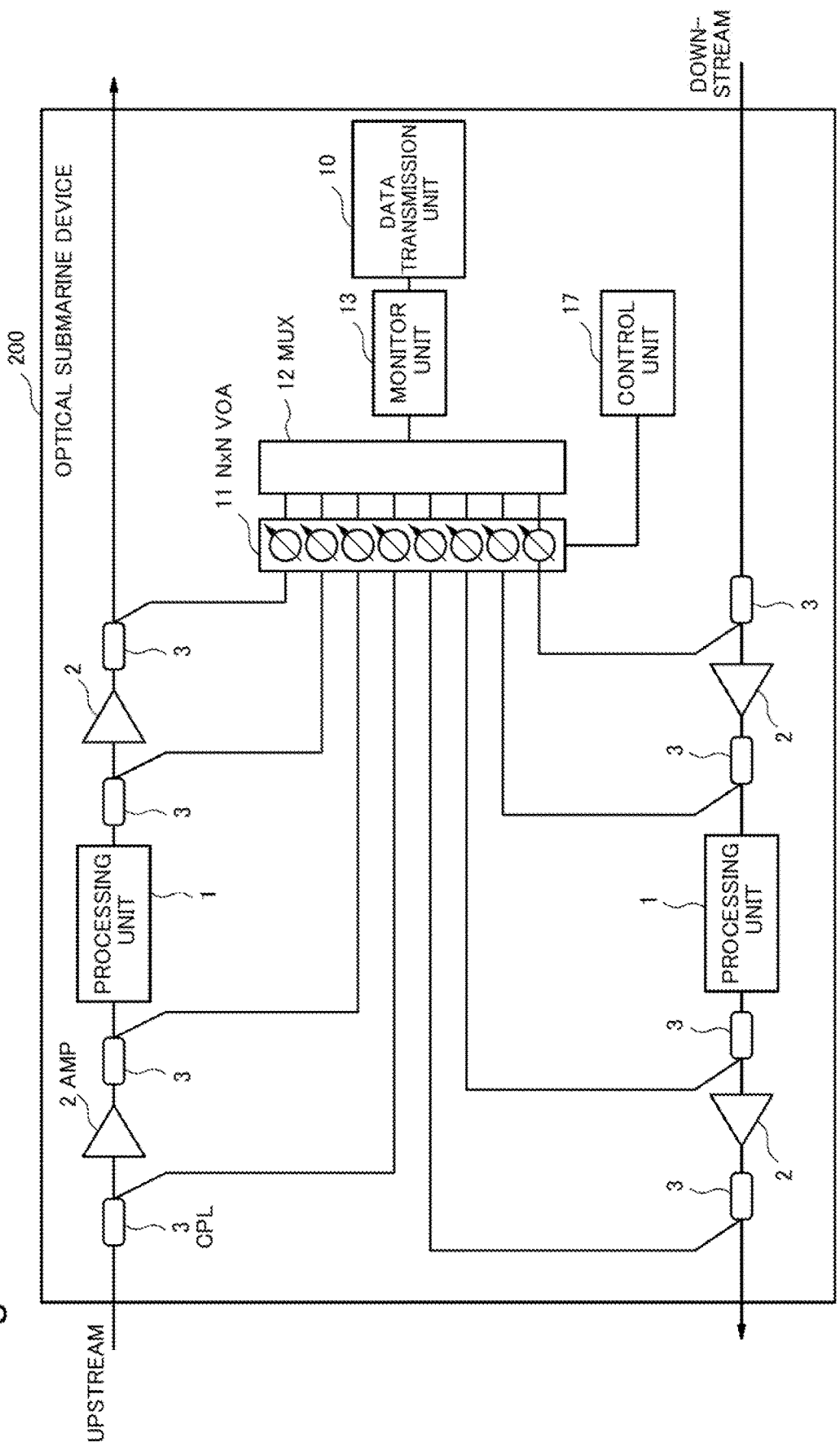
FIG. 5 is a block diagram for explaining an optical submarine device according to a second example embodiment.
Figure 6:
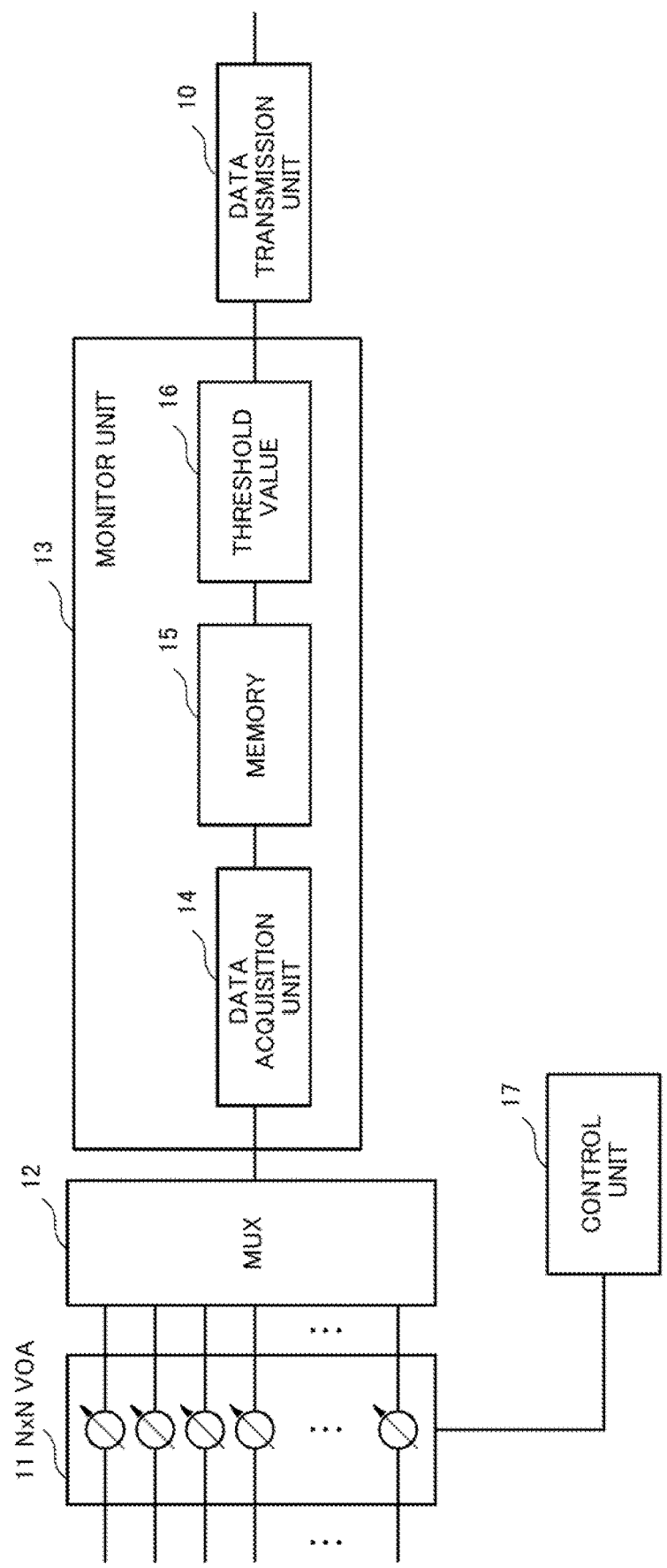
FIG. 6 is a block diagram for explaining details of a partial configuration of the optical submarine device in FIG. 5.

Next, an optical submarine device and an optical submarine device monitoring method according to a second example embodiment of the present invention will be described. FIG. 5 is a block diagram for explaining the optical submarine device according to the second example embodiment. FIG. 6 is a block diagram for explaining details of a partial configuration of the optical submarine device in FIG. 5. An element that is common or similar to that in the first example embodiment is denoted by the same reference sign, and a detailed description thereof will be omitted. The present example embodiment is an example embodiment in which the selecting means 54 in FIG. 1A is achieved by a means of achievement that is different from the first example embodiment.

(Configuration of Example Embodiment)

Similarly to the first example embodiment, an optical submarine device 200 in FIG. 5 is a submarine device to be inserted into the optical transmission line 42 such as an optical fiber connecting the terminal stations 41, illustrated in the optical communication system in FIG. 1B, and is exemplified by a submarine repeater, a submarine gain equalizer, a submarine branching device, and the like. Similarly to the first example embodiment, the optical submarine device 200 in FIG. 5 is inserted into an optical transmission line in an upstream direction and an optical transmission line in a downstream direction. Similarly to the first example embodiment, the optical submarine apparatus 200 in FIG. 5 includes a processing unit 1 inserted in the optical transmission line between the plurality of terminal stations of the optical communication system illustrated in FIG. 1B, and a selecting means to which a plurality of monitor lights each branched at each of a plurality of monitor points being set in the optical transmission line are input and by which one of the plurality of branched monitor lights is selected.

In the present example embodiment, an N×N variable optical attenuator 11 (N×N VOA 11) and a multiplexer 12 (MUX 12) are used as an example of a selecting means. Functions and operations of the N×N VOA 11 and the MUX 12 will be described later.

The optical submarine device 200 in FIG. 5 further includes a monitor unit 13 as an example of a monitoring means for monitoring light intensity of monitor light selected by the N×N VOA 11 and the MUX 12, and a control unit 17 as an example of a control means for controlling the N×N VOA 11 and the monitor unit 13. The optical submarine device 200 in FIG. 5 further includes a data transmission unit 10 as an example of a data transmission means for transmitting a monitoring result of the monitor unit 13 to a terminal station. Similarly to the first example embodiment, a CPL 3 as an example of a monitor light branching means is disposed at each of a plurality of monitor points being set in the optical transmission line in the optical submarine device 200 in FIG. 5, and the CPL 3 branches monitor light from the optical transmission line.

(Operation of Example Embodiment)

The N×N VOA 11 is a variable optical attenuator having N inputs and N outputs, and is capable of attenuating and outputting an input optical signal according to a control signal. The MUX 12 multiplexes a plurality of inputs and outputs a multiplexed optical signal. At each monitor point, signal light and monitor light are branched by using the CPL 3. Each of all monitor lights is input to each of the input ports of the N×N VOA 11. The output ports of the N×N VOA 11 are multiplexed by the MUX 12, input to a data acquisition unit 14 in the monitor unit 13 illustrated in FIG. 6, and converted into monitor data. The monitor data of the multiplexed monitor light are stored in a memory 15 and compared with a preset threshold value stored in a threshold value storing unit 16, and thereby a failure is detected. When a failure is detected, the control unit 17 changes an attenuation amount of each port of the N×N VOA 11, and thereby data of desired monitor light are acquired. For example, in order to acquire data of monitor light of a port 1 of the N×N VOA 11, attenuation amounts of ports other than the port 1 may be maximized. In this way, monitor light data of each monitor point are acquired and transmitted to the terminal station via the data transmission unit 10. A location where the failure occurs can be acquired by comparing the transmitted monitor light data with an expected value.

(Advantageous Effects of Example Embodiment)

The optical submarine device 200 according to the present example embodiment is able to provide an optical submarine device and an optical submarine device monitoring method that are capable of identifying a location where a failure occurs and collecting information necessary for recovery, by the monitor unit 13.

Further, by selecting the monitor light by the N×N VOA 11 and the MUX 12, it is possible to monitor a plurality of monitor lights by one monitor unit 13. In other words, it is possible to monitor a desired monitor point while achieving reduction in the number of components, miniaturization of the device, and cost reduction. In addition, since optical fibers of a plurality of monitor points can be bundled by the N×N VOA 11 and the MUX 12, complexity of wiring of the optical fibers can also be eliminated. As a result, it is also possible to shorten the manufacturing process and reduce connection errors.

Third Example Embodiment

Figure 7:
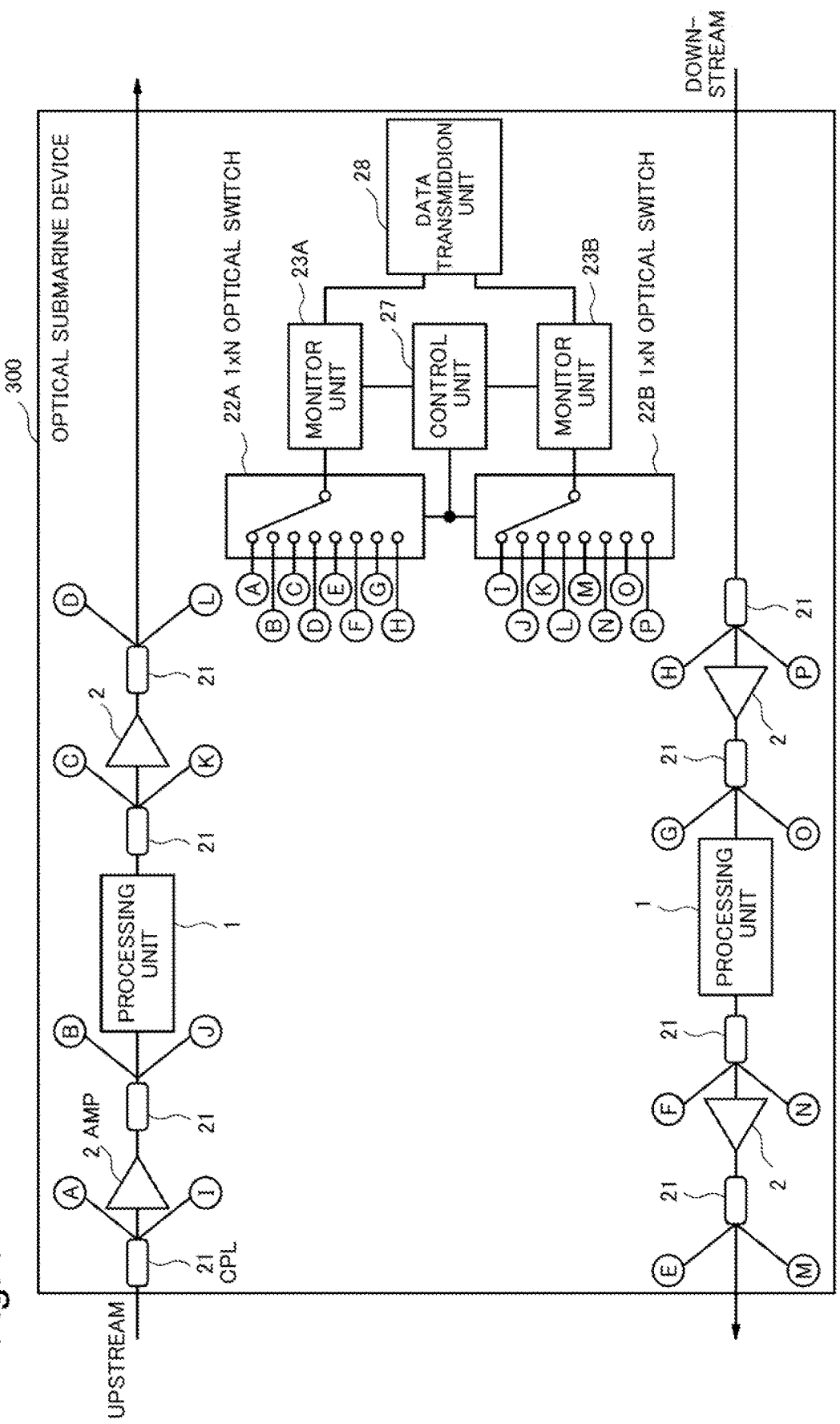
FIG. 7 is a block diagram for explaining an optical submarine device according to a third example embodiment.
Figure 8:
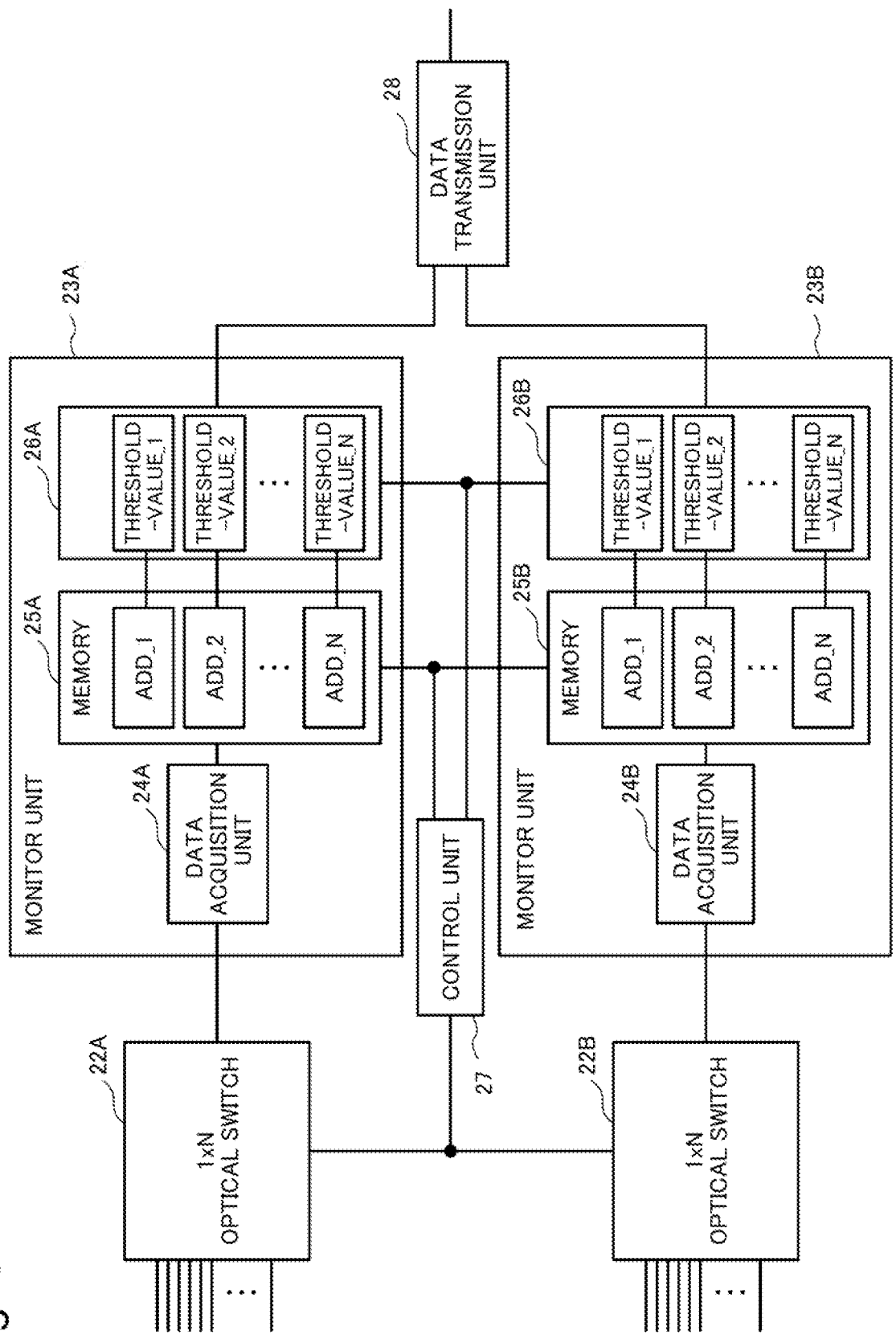
FIG. 8 is a block diagram for explaining details of a partial configuration of the optical submarine device in FIG. 7.
Figure 9:
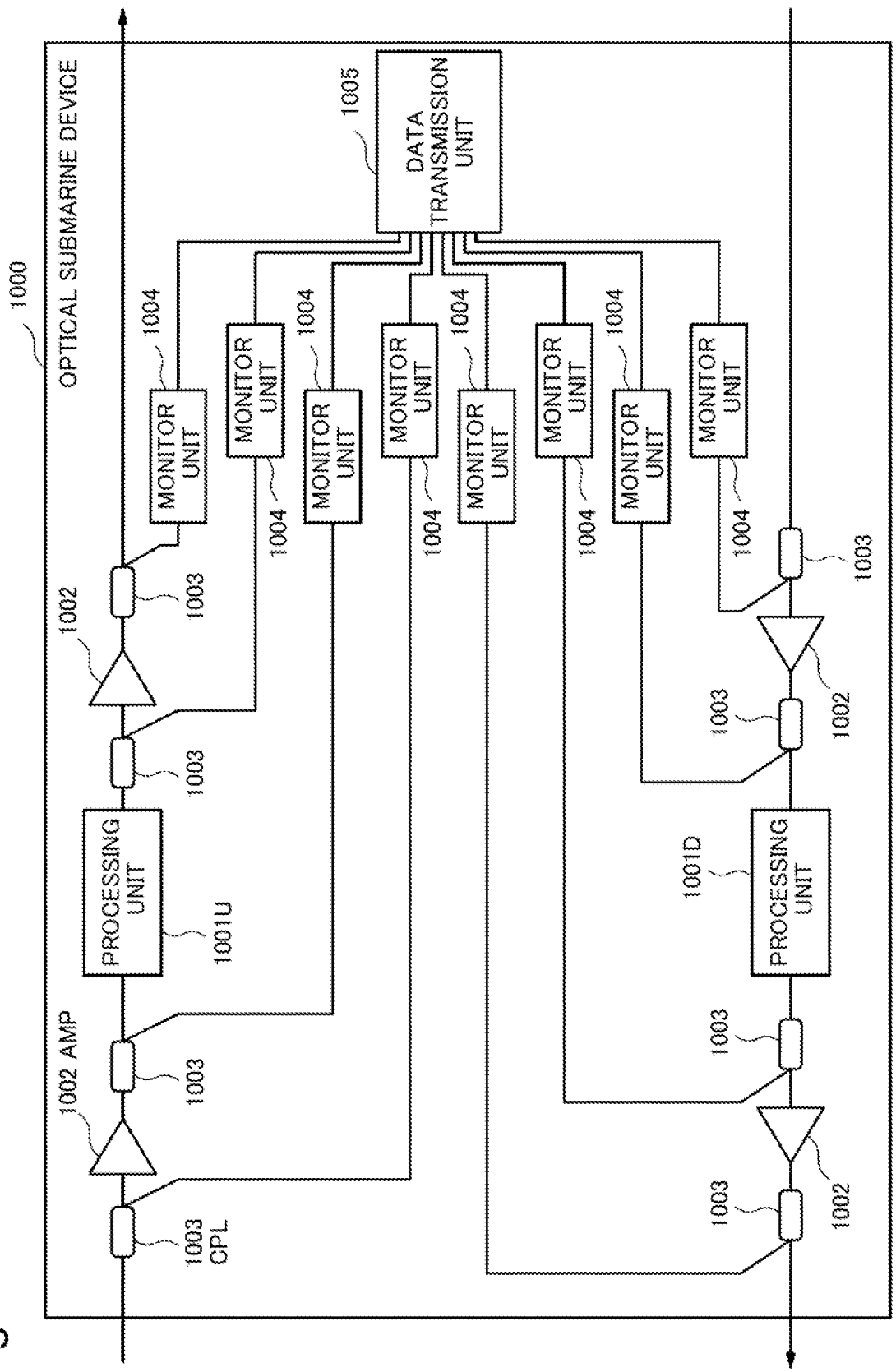
FIG. 9 is a block diagram for explaining an optical submarine device of the background art.

Next, an optical submarine device and an optical submarine device monitoring method according to a third example embodiment of the present invention will be described. FIG. 7 is a block diagram for explaining the optical submarine device according to the third example embodiment. FIG. 8 is a block diagram for explaining details of a partial configuration of the optical submarine device in FIG. 7. The present example embodiment is associated with a configuration in which the monitor unit of the first example embodiment illustrated in FIGS. 2A and 3 is redundant. An element common or similar to that in the first example embodiment is denoted by the same reference sign, and a detailed description thereof will be omitted.

In the optical submarine device 100 according to the above-described first example embodiment, since the monitor unit 5 is connected to each monitor point, when a redundant configuration is to be achieved, the number of components, a size of the device, and a price of the device are further increased. Meanwhile, the present example embodiment enables a redundant configuration with a small number of components.

Similarly to the first example embodiment, an optical submarine device 300 in FIG. 7 is a submarine device to be inserted into the optical transmission line 42 such as an optical fiber connecting the terminal stations 41, illustrated in the optical communication system in FIG. 1B, and is exemplified by a submarine repeater, a submarine gain equalizer, a submarine branching device, and the like. The optical submarine device 300 in FIG. 7 is inserted into an optical transmission line in an upstream direction and an optical transmission line in a downstream direction. The optical submarine device 300 in FIG. 7 includes a processing unit 1 inserted into an optical transmission line such as the optical transmission line 42 between the plurality of terminal stations 41 of the optical communication system illustrated in FIG. 1B, and N×1 optical switches 22A and 22B as an example of an optical signal selecting means to which monitor lights each branched at each of a plurality of monitor points being set in the optical transmission line are input and by which one of the plurality of branched monitor lights is selected. The optical submarine device 300 in FIG. 7 further includes monitor units 23A and 23B as an example of a monitoring means for monitoring light intensity of the monitor light selected by the N×1 optical switches 22A and 22B, and a control unit 27 as an example of a control means for controlling the N×1 optical switches 22A and 22B and the monitor units 23A and 23B. The optical submarine device 300 in FIG. 7 further includes a data transmission unit 28 as an example of a data transmission means for transmitting a monitoring result of the monitor units 23A and 23B to the terminal station.

In the present example embodiment, a 1×3 coupler 21 (1×3 CPL 21) as an example of a monitor light branching means is disposed at each of a plurality of monitor points being set in the optical transmission line in the optical submarine device 300 in FIG. 7. The 1×3 CPL 21 branches an optical signal on the optical transmission line into signal light, monitor light 1, and monitor light 2. All the monitor lights 1 are each input to each input port of the N×1 optical switch 22A, and all the monitor lights 2 are each input to each input port of the N×1 optical switch 22B. As illustrated in FIG. 7, the optical submarine device 300 in FIG. 7 is configured in such a way that monitor lights A, B, C, and D of the 1×3 CPL 21 disposed in an upstream direction optical transmission line and monitor lights E, F, G, and H of the 1×3 CPL 21 disposed in a downstream direction optical transmission line are input to input ports of the N×1 optical switch 22A. The optical submarine device 300 in FIG. 7 is further configured in such a way that monitor lights I, J, K, and L of the 1×3 CPL 21 disposed in the upstream direction optical transmission line and monitor lights M, N, O, and P of the 1×3 CPL 21 disposed in the downstream direction optical transmission line are input to input ports of the N×1 optical switch 22B.

A connection between the input port and the output port of the N×1 optical switch 22A can be switched by the control unit 27 in a similar way to the first example embodiment. The same applies to the N×1 optical switch 22B. However, in a case of the present example embodiment, a connection between the input port and the output port of the N×1 optical switch 22A and a connection between the input port and the output port of the N×1 optical switch 22B are made to be monitor lights from the same monitor point. For example, in FIG. 7, the connection between the input port and the output port of the N×1 optical switch 22A and the connection between the input port and the output port of the N×1 optical switch 22B are made to be monitor light A and monitor light I from the same monitor point. The outputs of the N×1 optical switches 22A and 22B are input to the monitor units 23A and 23B illustrated in FIG. 7. As illustrated in FIG. 8, the monitor unit 23A includes a data acquisition unit 24A, a memory for storing data, and a threshold value storing unit 26A for storing a preset threshold value for alarm detection, and the monitor unit 23B includes a data acquisition unit 24B, a memory 25B for storing data, and a threshold value storing unit 26B for storing a preset threshold value for alarm detection. The memory 25A includes N memory areas ADD_1 to ADD_N in association with the N×1 optical switch 22A having N input ports, and the memory 25B includes N memory areas ADD_1 to ADD_N in association with the N×1 optical switch 22B having N input ports. The threshold value storing units 26A and 26B each include N threshold value storing areas in association with the N memory areas of the memories 25A and 25B. The data acquisition unit 24A of the monitor unit 23A converts monitor light into data, and stores the data in the memory 25A related to the monitor point, and the data acquisition unit 24B of the monitor unit 23B converts monitor light into data, and stores the data in the memory related to the monitor point. The monitor unit 23A compares the data stored in the memory 25A with a related threshold value stored in the threshold value storing unit 26A, and thereby detects a failure. The monitor unit 23B compares the data stored in the memory 25B with the related threshold value stored in the threshold value storing unit 26B, and thereby detects a failure. The data transmission unit 10 collectively transmits the monitor data from the monitor unit 23A and presence or absence of a failure, and the monitor data from the monitor unit 23B and presence or absence of a failure, to each terminal station.

The optical submarine device 300 according to the present example embodiment achieves monitoring adopting a redundant configuration. With respect to a certain monitor point, when a failure is detected by either the monitor unit 23A or the monitor unit 23B, it is determined that the failure is a failure of the monitoring system, and it is not determined that the failure is a failure of the monitor point. When a failure is detected by both the monitor unit 23A and the monitor unit 23B, it is determined that the failure is a failure of the monitor point, and the data transmission unit 28 transmits monitor data and an alarm to the terminal station.

The redundant configuration disclosed in the present example embodiment is also applicable to the second example embodiment described above. In the second example embodiment described above, the CPL 3 may be replaced with the 1×3 CPL 21 according to the present example embodiment, and the N×N VOA 11, the MUX 12, and the monitor unit 13 may be configured as two systems, and the control unit 17 may control the two systems of N×N VOA 11.

(Advantageous Effects of Example Embodiment)

The optical submarine device 300 according to the present example embodiment is able to provide an optical submarine device and an optical submarine device monitoring method that are capable of identifying a location where a failure occurs and collecting information necessary for recovery, by the monitor units 23A and 23B.

Further, by switching the monitor light by the N×1 optical switches 22A and 22B, it becomes possible to monitor a plurality of monitor lights by the monitor units 23A and 23B. In other words, it is possible to monitor a desired monitor point while achieving reduction in the number of components, miniaturization of the device, and cost reduction. In addition, since optical fibers of a plurality of monitor points can be bundled by the N×1 optical switches 22A and 22B, complexity of wiring of the optical fibers can also be eliminated. As a result, it is possible to shorten the manufacturing process and reduce connection errors.

Furthermore, the optical submarine device 300 according to the present example embodiment is capable of achieving a redundant configuration with a small number of components.

Other Example Embodiments

Although the desirable example embodiments have been described above with reference to the drawings, the present invention is not limited to these example embodiments, and various changes and modifications are possible. It will be understood that the transmission method of the data transmission unit 10 described with reference to FIGS. 2A and 2B is also applicable to the data transmission unit 10 according to the second example embodiment illustrated in FIG. 5, and is also applicable to the data transmission unit 28 according to the third example embodiment illustrated in FIG. 7.

Further, for example, in the first example embodiment, the example second embodiment, and the third example embodiment described above, an example of a configuration in which eight monitor points are monitored has been described, but the present invention can be applied not only to the configuration in which a total number of the monitor points is eight, but also to a configuration in which monitor points less or more than eight in total are used. Further, for example, the present invention is not limited to the configuration of the optical submarine device described as the first example embodiment, the second example embodiment, and the third example embodiment, and can be applied even in a case where the configuration is complicated or simplified. It is needless to say that various modifications are possible within the scope of the invention described in the claims, and these modifications are also included in the scope of the invention.

While the invention has been particularly shown and described with reference to example embodiments thereof, the invention is not limited to these example embodiments. It will be understood by those of ordinary skill in the art that various changes in form and details may be made therein without departing from the spirit and scope of the present invention as defined by the claims.

This application is based upon and claims the benefit of priority from Japanese Patent Application No. 2019-172751, filed on Sep. 24, 2019, the disclosure of which is incorporated herein in its entirety by reference.

REFERENCE SIGNS LIST

1 Processing Unit
2 AMP
3 CPL
4, 22A, 22B N×1 Optical Switch
5, 13, 23A, 23B Monitor Unit
6, 17, 27 Control Unit
28 Data Transmission Unit
11 N×N VOA
12 MUX
21 1×3CPL
100, 200, 300 Optical Submarine Device

What is claimed is:

1. A submarine device comprising:
a first branching unit that branches an optical signal and that outputs first branched light;
a processing unit that processes the first branched light as an input optical signal and outputs an output optical signal;
a second branching unit that branches the output optical signal output from the processing unit and that outputs second branched light;
a selecting unit that selects branched light from the first branched light and the second branched light, and that outputs the branched light; and
a monitoring unit that monitors the selected branched light, wherein
the selecting unit includes an N×N variable optical attenuator having a plurality of port pairs, each port pair including an input port and an output port, and
for each of the plurality of port pairs, the attenuator attenuates a port optical signal at the input port of the port pair according to a control and outputs the attenuated port optical signal at the output port of the port pair.

2. The submarine device according to claim 1, wherein the selecting unit is a N×1 optical switch having a plurality of switch input ports and one switch output port, and that connects one of the plurality of switch input ports to the one switch output port.

3. The submarine device according to claim 1, wherein the selecting unit further includes a multiplexer for multiplexing the attenuated port optical signal output at the output port of each of the plurality of port pairs plurality of output ports of the N×N variable optical attenuator.

4. The submarine device according to claim 1, wherein the monitoring unit includes a data acquisition unit that acquires light intensity data of the selected branched light, and a memory unit that accumulates the light intensity data acquired by the data acquisition unit.

5. The submarine device according to claim 1, wherein the selecting unit is one of a plurality of selecting units, the first branched light is one a plurality of first branched lights output by the first branching unit and that are input to the plurality of the selecting units, and the second branched light is one of a plurality of second branched lights output by the second branching unit and that are input to the plurality of the selecting units.

6. The submarine device according to claim 5, wherein the monitoring unit is one of a plurality of the monitoring units,
the branched light is one of a plurality of branched lights output by the plurality of selecting units and are respectively monitored by the plurality of monitoring units, and
a failure occurs is determined to have occurred when all of the plurality of monitoring units detect the failure.

7. An optical communication system comprising:
an optical transmission line between a plurality of terminal stations; and
the submarine device according to claim 1 inserted into the optical transmission line.

8. A submarine device comprising:
a first optical transmission line including a first input node and a first output node;
a second optical transmission line including a second input node and a second output node and that is different from the first optical transmission line;
a first branching unit at each of a plurality of first monitor points set in the first optical transmission line that branches first monitor light and that outputs first branched light;

a second branching unit at each of a plurality of second monitor points set in the set optical transmission line that branches second monitor light and that outputs second branched light;
a first processing unit inserted into the first optical transmission line that processes the first branched light output by the first branching unit at one of the plurality of first monitor points;
a second processing unit inserted into the second optical transmission line that processes the second branched light output by the second branching unit at one of the plurality of second monitor points;
a selecting unit that selects branched light from the first branched light output by the first branching unit at each of the plurality of first monitor points and the second branched light output by the second branching unit at each of the plurality of second monitor points, and that outputs the branched light; and
a monitoring unit that monitors the selected branched light.

9. A submarine device monitoring method comprising:
branching, by a first branching unit of a submarine device, an optical signal, and outputting first branched light;
processing, by a processing unit of the submarine device, the first branched light as an input optical signal, and outputting an output optical signal;
branching, by a second branching unit of the submarine device, the output optical signal output from the processing unit, and outputting second branched light;
selecting, by a selecting unit of the submarine device, branched light from the first branched light and the second branched light, and outputting the branched light; and
monitoring, by a monitoring unit of the submarine device, the selected branched light, wherein
the selecting unit includes an N×N variable optical attenuator having a plurality of port pairs, each port pair including an input port and an output port,
the method further comprises attenuating, by the attenuator and for each of the plurality of port pairs, a port optical signal at the input port of the port pair according to a control, and outputting the attenuated port optical signal at the output port of the port pair.

* * * * *